United States Patent
Rogers et al.

(10) Patent No.: US 6,212,412 B1
(45) Date of Patent: Apr. 3, 2001

(54) SYSTEM AND METHOD FOR CHARACTER CASE CONTROL IN A WIRELESS COMMUNICATION DEVICE

(75) Inventors: John G. Rogers, San Diego; Jason B. Kenagy, Encinitas, both of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/094,360

(22) Filed: Jun. 9, 1998

(51) Int. Cl.$^7$ ........................................... H04B 1/38
(52) U.S. Cl. ..................... 455/575; 455/550; 455/418; 341/29
(58) Field of Search ...................... 455/466, 564, 455/565, 566, 90, 575, 550; 379/428, 433, 434, 456; 341/22, 23, 29, 34; 345/168, 172, 169

(56) References Cited

U.S. PATENT DOCUMENTS

| | | | |
|---|---|---|---|
| 4,655,621 | * | 4/1987 | Holden .................................. 400/100 |
| 5,491,745 | * | 2/1996 | Roeder .................................. 379/355 |
| 5,737,394 | * | 4/1998 | Anderson et al. ................. 379/88.11 |
| 5,864,765 | * | 1/1999 | Barvesten ............................ 455/565 |
| 5,901,365 | * | 5/1999 | Yasuda et al. ....................... 455/564 |
| 5,926,769 | * | 7/1999 | Valimaa et al. ..................... 455/564 |
| 6,021,335 | * | 2/2000 | Zicker et al. ........................ 455/564 |

FOREIGN PATENT DOCUMENTS

| | | | |
|---|---|---|---|
| 0469546 | 7/1991 | (EP) | ............... H04M/1/274 |
| 0755142 | 7/1996 | (EP) | ............... H04M/1/274 |
| 2284289 | 7/1994 | (GB) | ............... H03M/11/08 |
| 9602394 | 2/1996 | (WO) | ............... B41J/5/10 |

OTHER PUBLICATIONS

Nokia Mobile Phones USA: Nokia 2160 Owner's Manual pp. 21–22, Dec. 1996.*
Patent Abstracts of Japan, vol. 010, No. 330 (P–514), Nov. 11, 1986 & JP 61 134828 A, Canon Incorporated, Jun. 21, 1986, Abstract.

* cited by examiner

Primary Examiner—Dwayne Bost
Assistant Examiner—Charles Craver
(74) Attorney, Agent, or Firm—Philip Wadsworth; Charles D. Brown; Tom Streeter

(57) ABSTRACT

A technique to switch between upper and lowercase alphabetic characters in a wireless communication device measures the period of time in which a numeric key is held in the depressed position by the user. If a numeric key is pressed by the user for a period of time less than a predetermined threshold time, the selected alphabetic character is displayed in a default character case. If the selected numeric key is held in the depressed position for a period of time exceeding the predetermined threshold period, the character case is altered and the altered alphabetic character is displayed for the user. The user selects the desired alphabetic character by activating a selected numeric key one or more times corresponding to the desired alphabetic letter. If the selected numeric key is held in the depressed position for a period of time exceeding the threshold period during any of the button depressions, the system automatically changes to the altered alphabetic character case. The alphabetic character case is controlled on a character by character basis such that entry of a new alphabetic character uses the default character case unless the selected numeric key is again held in the depressed position for a period of time exceeding the predetermined threshold.

1 Claim, 5 Drawing Sheets

US 6,212,412 B1

SYSTEM AND METHOD FOR CHARACTER CASE CONTROL IN A WIRELESS COMMUNICATION DEVICE

BACKGROUND OF THE INVENTION

I. Field Of The Invention

The present invention is related generally to a wireless communication device and, more particularly, to a system and method for controlling the character case of alphanumeric text in a wireless communication device.

II. Background Of The Invention

Wireless communication devices, such as cellular telephones, are widely used as a replacement for conventional telephone systems. In addition to functioning as a replacement for a conventional telephone, wireless communication devices offer the advantage of portability, thus enabling the user to establish a wireless communication link between virtually any two locations on Earth.

In addition to conventional voice communication, wireless communication devices may include electronic mail (e-mail) and other forms of text messaging. For example, some wireless communication systems provide for short messaging services (SMS) data. With these capabilities, a user may retrieve e-mail or text messages from a central storage location. In addition, the user may utilize messaging capabilities to send an e-mail or text message from the wireless communication device to a location remote from the user.

The ability to use upper and lowercase characters in text messaging enhances the readability of text messages. Although some wireless communication devices have the ability to implement upper and lowercase characters, there is no convenient way to generate alphanumeric text with upper and lowercase characters. Therefore, it can be appreciated that there is a significant need for a system and method to control the case of text characters in a wireless communication device. The present invention provides this and other advantages as will be illustrated by the following description and accompanying figures.

SUMMARY OF THE INVENTION

The present invention is embodied in a system and method for controlling the alphabetic case of data entered into a wireless communication device in a text entry mode. In an exemplary embodiment, the wireless communications device includes a keypad input device having a plurality of keys to be selectively activated by the user and a timer to measure a period of activation of the selected keys. A processor selects the appropriate alphabetic character based on the number of times a numeric key is depressed and upon the length of time that a numeric key is held in the depressed position, and stores the appropriate alphabetic text in a storage area. The change in alphabetic character case applies only to the current character. When the processor has entered the alphabetic character into the data storage area, the subsequent character is initially selected with the default character case.

In one embodiment, lowercase alphabetic characters are set as a default case. The user presses selected ones of the numeric keys on the wireless communication device keypad to enter alphabetic text. If the keypad is pressed and released with a time period less than the predetermined threshold period, the processor enters the default lowercase alphabetic character in the data storage area. If the user presses and holds the numeric keypad in the depressed position for a period of time that exceeds the predetermined threshold, the processor will enter the corresponding uppercase alphabetic character in the data storage area.

DETAILED DESCRIPTION OF THE PREFERRED EMBODIMENTS

Figure 1A:
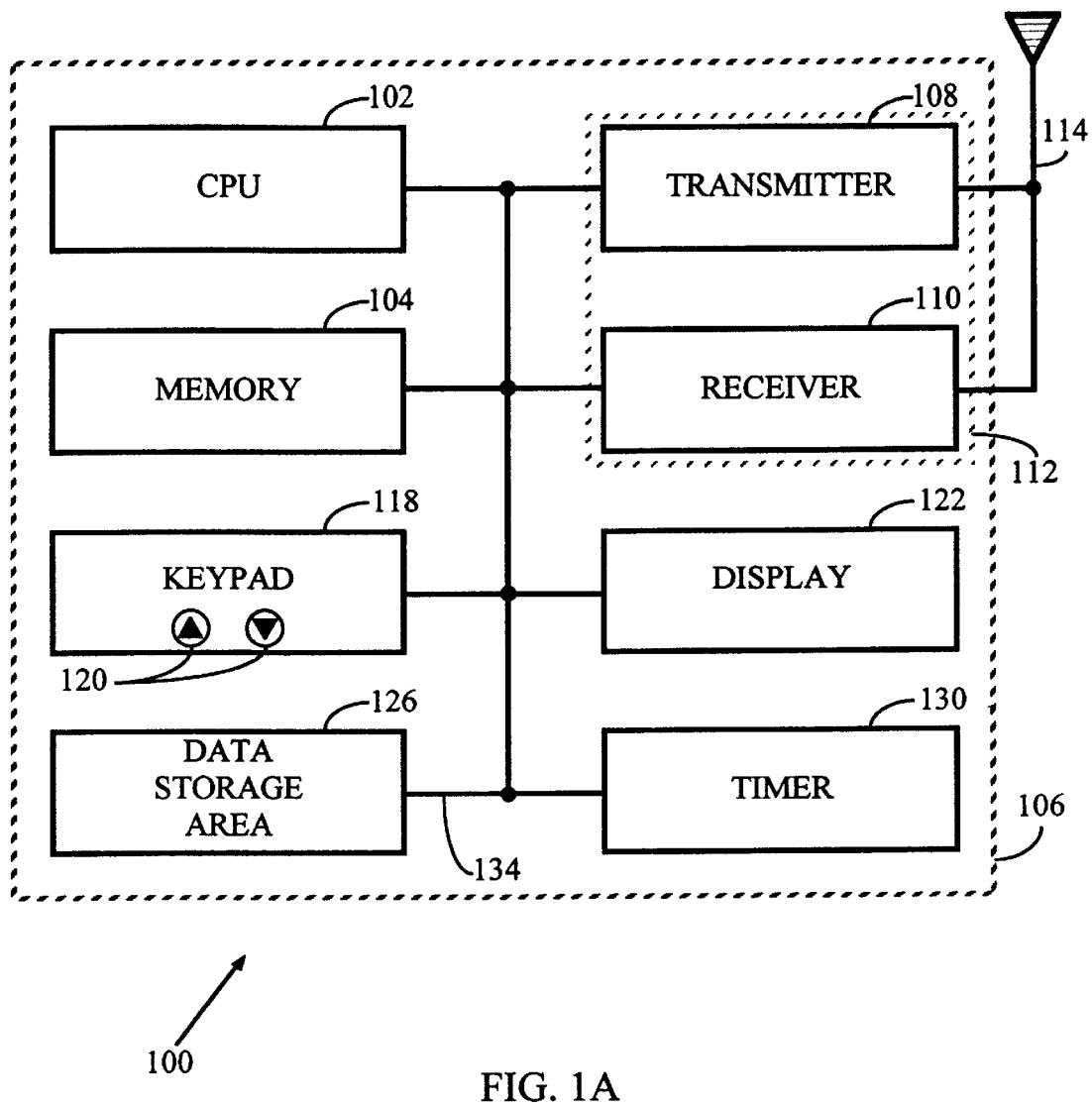
FIG. 1A is a functional block diagram of an exemplary embodiment of the wireless communication device of the present invention.

The present invention provides a technique for controlling the upper and lowercase configuration of alphanumeric text characters. While the following description is directed primarily to the control of text characters in a cellular telephone communication system, it is clear that the principles of the present invention may be readily extended to any wireless communication system.

The conventional wireless communication device includes an alphanumeric keypad containing the digits 0–9. The numeric keypads 2–9 are also labeled with alphabetic characters. For example, the numeric keypad 2 is also labeled with the alphabetic characters "ABC" while the numeric keypad 3 is also labeled with the alphabetic characters "DEF." A common technique to enter alphabetic text into a wireless communication device utilizes the numeric keypad. The user enters a text mode in the wireless communication device and presses the numeric keypad one or more times corresponding to the desired alphabetic character. For example, the user may enter the letter "A" by pressing the numeric keypad 2 a single time. The user presses the numeric keypad 2 twice to enter the alphabetic character "B". Similarly, the user presses the numeric keypad 3 once, twice, or three times to enter the alphabetic characters "D," "E," and "F," respectively.

Some wireless communication devices allow the user to change the case of the text characters by pressing a predetermined button, such as the "*" key to shift between uppercase characters and lowercase characters. This key functions in a manner similar to a "Caps Lock" key on a conventional computer keyboard. Thus, if the user activates the predetermined button (e.g., the "*" key) to change to uppercase characters, all subsequently entered text characters will be uppercase characters. To change back to lowercase characters, the user presses the predetermined button (e.g., the "*" key) to toggle back to lowercase characters.

The present invention utilizes conventional techniques for entering alphanumeric text, but provides a unique technique for shifting between upper and lowercase characters. The present invention is embodied in a system 100 illustrated in the functional block diagram of FIG. 1A. The system 100 includes a central processing unit (CPU) 102, which controls operation of the system. A memory 104, which may include both read-only memory (ROM) and random access memory (RAM), provides instructions and data to the CPU 102. A portion of the memory 104 may also include non-volatile random access memory. As will be discussed in greater detail below, the non-volatile random access memory portion of the memory 104 may be used to store one or more destination telephone numbers and associated data.

The system 100, which is typically embodied in a wireless communication device such as a cellular telephone, also includes a housing 106 that contains a transmitter 108 and a receiver 110 to allow transmission and reception of data, such as audio communications, between the system 100 and a remote location, such as a cell site controller (not shown). The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein.

A keypad 118 is attached to the housing 106 for operation by the user in a conventional manner. As will be described below, the keypad 118 provides a convenient input device by which destination telephone numbers and alphanumeric text may be entered by the user. The keypad 118 also includes one or more scroll buttons 120 that assist the user in the operation of the wireless communication device.

The system 100 also includes a display 122 that may be conveniently used to display instructions to the user as well as user-entered data, such as destination telephone numbers and alphanumeric text. In an exemplary embodiment of the system 100, the display 122 will display data entered by the user using uppercase and lowercase alphabetic characters as well as numeric characters. This provides visual feedback to the user as one or more alphanumeric characters are entered into the system 100.

The user-entered data, such as e-mail, destination telephone numbers, and the like, are entered into the system 100 using the keypad 118 and are stored in a data storage area 126. The data storage area 126 may be a text buffer for use with e-mail messaging or may be part of a telephone number storage area sometimes referred to as a speed-dial storage area. The data storage area 126 may be included in the non-volatile memory portion of the memory 104 or may be a separate storage area. While depicted as a conventional memory, those skilled in the art can appreciate that the data storage area 126 may be any suitable data structure.

The system 100 also includes a timer 130, which may typically be included in the CPU 102. As will be discussed in greater detail below, the system 100 uses the timer 130 to determine when to switch the alphabetic character case from uppercase to lowercase or lowercase to uppercase. Details of the use of the timer 130 are provided below.

The various components of the system 100 are coupled together by a bus system 134, which may include a power bus, control signal bus, and status signal bus in addition to a data bus. However, for the sake of clarity, the various buses are illustrated in FIG. 1A as the bus system 134.

Figure 1B:
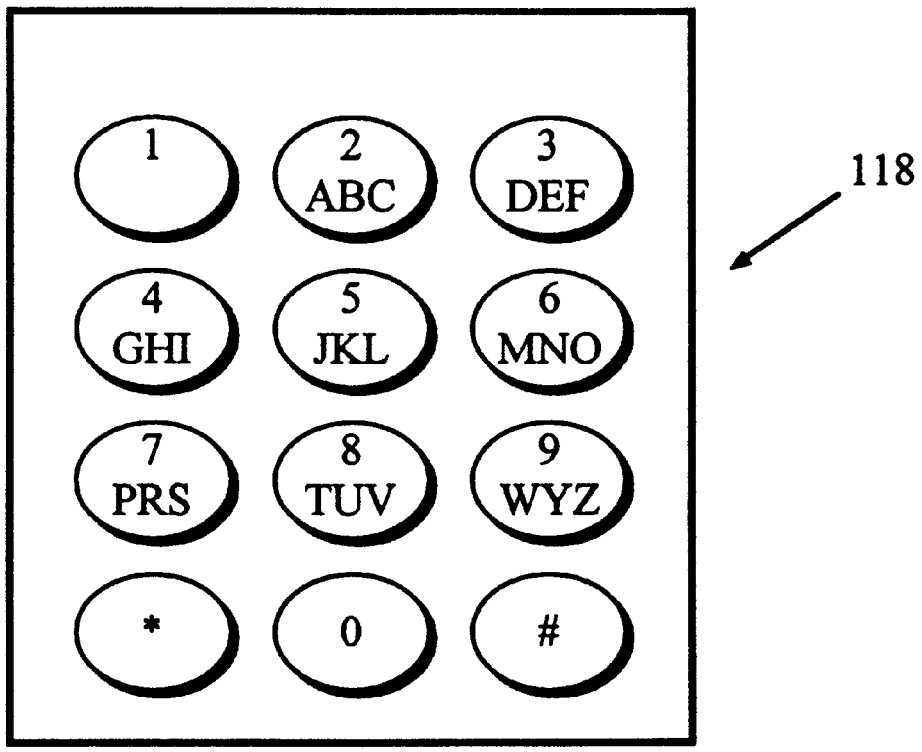
FIG. 1B is a detailed illustration of a portion of the keypad of the device of FIG. 1A.

The system 100 allows the entry of text data using the keypad 118. A detailed illustration of a portion of the keypad 118 is illustrated in FIG. 1B. For the sake of clarity, some keys such as a "SEND" key and the scroll keys 120, are not shown in FIG. 1B. The keypad 118 includes ten numeric keys with the digits 0–9 as well as a "*" key and a "#" key. The digits 0 and 1 on the keypad 118 have no associated alphabetic characters. However, the numeric keys 2–9 each have three or more alphabetic characters associated with it. For example, the numeric key 2 is associated with the alphabetic characters "ABC," while the numeric key 3 is associated with the alphabetic characters "DEF." In some wireless communication device, the alphabetic characters "Q" and "Z" are not shown on the numeric keys of the keypad 118. In the exemplary embodiment shown in FIG. 1B, the alphabetic characters "Q" and "Z" are shown on the numeric keys 7 and 9, respectively.

The user enters the desired text by enabling a text entry or edit mode, such as a phone book entry mode, in a conventional fashion. The data itself is entered by activating the numeric keys of the keypad 118 one or more times corresponding to the desired numeric or alphabetic character. For example, the user may enter the alphabetic character "A" by pressing the numeric key 2 a single time. The user can enter the alphabetic character "B" by rapidly pressing the numeric key 2 two times. Similarly, the user enters the alphabetic character "C" by rapidly pressing the numeric key 2 three times. The user can enter the digit "2" by rapidly pressing the numeric key 2 four times. Thus, the user selects a current character by rapidly pressing a selected numeric key one or more times.

The system 100 enters the current character in the data storage area 126 when the user presses another key on the keypad 118 or after a predetermined period of time has expired since the last activation of the previously activated numeric key (e.g., the numeric key 2). The activation of a different numeric key (e.g., the numeric key 3) is interpreted by the system 100 as an indication that the current character is correct. The system 100 enters the current character (e.g., the alphabetic character "B") into the data storage area 126 and displays the alphabetic character associated with the numeric key 3. Alternatively, the user may rapidly press the desired numeric key a number of times to select the desired current character and wait the predetermined period of time without activating any numeric key. When the predetermined period of time, referred to herein as the inter-character interval, has expired without activation of any additional numeric keys, the system 100 enters the current character into the data storage area 126.

For example, the user may enter the alphabetic text sequence "BE" by pressing the numeric key 2 two times in quick succession (to enter the alphabetic character "B") and subsequently pressing the numeric key 3 two times in quick succession (to enter the alphabetic character "E"). It should be noted that the term "quick succession" is intended to describe rapid multiple presses of a selected numeric key where the period of time between each press is less than the inter-character interval. When the user presses the numeric key 2 the first time, the display 122 will display the alphabetic character "A." When the user presses the numeric key the second time in quick succession, the display will shown the alphabetic character "B." In the example above, system 100 will store the current character (e.g., the alphabetic character "B") in the storage area when the user presses the numeric key 3 the first time. In addition, the display 122 will show the alphabetic character "D" the first time the user presses the numeric key 3. When the user presses the numeric key 3 a second time in quick succession, the display 122 will show the alphabetic character "E." The user may quickly enter alphabetic characters associated with different ones of the numeric keys by simply pressing the numeric key a predetermined number of times corresponding to the desired alphabetic character.

Thus, in the example above, the user may enter the alphabetic character "B" by pressing the numeric key 2 two times in quick succession followed by the activation of the different numeric key (e.g., the numeric key 3) or by pressing the numeric key 2 two times in quick succession followed by the inter-character interval during which no numeric key is activated.

Similarly, the user may enter the alphabetic text "BA" by pressing the numeric keypad two times in quick succession (to enter the alphabetic character "B") and then waiting the inter-character interval before pressing the numeric keypad 2 a single time (to enter the alphabetic character "A").

The inter-character interval is measured by the timer 130 in a conventional fashion that need not be described in greater detail herein. In an exemplary embodiment, the inter-character interval is approximately two seconds. That is, the system 100 will assume the user has completed activation of the desired numeric key on the keypad 118 if two seconds goes by without any activation of the numeric key associated with the current character.

In addition to the ability to enter alphanumeric text using the keypad 118, the system 100 provides a simple technique for shifting between upper and lowercase alphabetic characters. While prior art systems have the ability to enter upper and lowercase text characters, the shift between upper and lowercase characters is generally accomplished by activating a key on the keypad that is specifically dedicated to that function. For example, it is known to shift between upper and lowercase characters by pressing a dedicated key (e.g., the "*" key) on the keypad 118. This permanently shifts the case of all subsequently entered characters until the dedicated key is pressed again. Thus, this function may be thought of as a "Caps Lock" function on a conventional typewriter or computer keyboard. The disadvantage of this approach is that it requires the dedication of a key specifically for the purpose of shifting the case of alphabetic text. The typical wireless communication device has a limited number of keys on the keypad 118 and can ill afford to dedicate a key for this purpose. Furthermore, the "Caps Lock" functionality of the prior art requires additional keypad strokes in an already cumbersome data entry system.

The system 100 permits the selection of upper and lowercase characters without the need for a dedicated key on the keypad 118. In an exemplary embodiment, the system 100 alters the case of the alphabetic text on a character-by-character basis. In this embodiment, the system 100 may be thought of as a "Shift" key function on a typewriter or a computer keyboard and applies only to the current character. Alternatively, the system 100 may be programmed to change the case of all subsequently entered characters until the case of the text is again altered by the user.

The system 100 uses the timer 130 to determine whether or not to change the text of the alphabetic characters. If the user presses a selected numeric key several times in quick succession, the system 100 alters the selected alphabetic character based on the number of times that the numeric key is pressed. However, if the user presses and holds the numeric key for a threshold time period, referred to herein as "a character case threshold" time period, the system 100 will change the case of the current alphabetic character. In an exemplary embodiment, the default case for alphabetic characters is lowercase. In this embodiment, the user enters lowercase alphabetic characters simply by pressing the desired numeric key the appropriate number of times in quick succession in the manner described above. If the user depresses and holds the numeric key in a depressed position for greater than the character case threshold time period, the system 100 automatically changes the current character to an uppercase character. The user selects the desired uppercase character in the conventional manner (i.e., by pressing the desired numeric key the appropriate number of times in quick succession). Alternatively, the default case for the alphabetic characters may be upper case. In this embodiment, the system 100 automatically changes the current character to a lowercase character when the user depresses and holds a numeric key for greater than the character case threshold time period.

In an exemplary embodiment, the system 100 displays the current character on the display 122. In the example given above, the display 122 will display the lowercase alphabetic character "a" in response to the user pressing the numeric key 2 the first time. It should be noted that the user may press and hold the numeric key 2 in the depressed position for a period of time greater than the character case threshold time period. In this case, the display 122 would show an uppercase "A." When the user presses the numeric key 2 a second time, the display now shows a lowercase alphabetic "b." If the second press of the numeric key 2 was for a time period more than the character threshold time period, then after the expiration of the case threshold time period an upper case alphabetic character "B" is shown. Thus, the system 100 provides visual queues to the user to assist in entering alphanumeric text into the data storage area 126.

Figure 2:
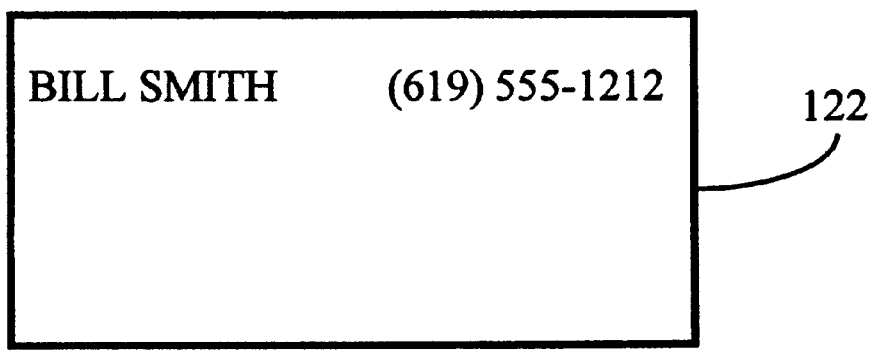
FIG. 2 illustrates the display of the wireless communication device of FIG. 1 with text data having upper and lowercase characters.

A sample alphanumeric text message is illustrate in FIG. 2. In this example, the user is entering a destination telephone number and associated name using the system 100. In this embodiment, the data storage area 126 may be the phone book or speed-dial storage area of a wireless communication device. The user enters the appropriate text entry mode of the system 100 by selecting, by way of example, a menu function to enter a new destination telephone number.

The user enters the name "Bill" by pressing the numeric keypad 2 two times in quick succession with one of the two keypad presses being held in the depressed position for a period of time that exceeds the character case threshold time period. For example, the user may press the numeric key 2 two times (to select the lowercase alphabetic character "b") and hold the numeric key 2 in the depressed position for the character case threshold time period of time on the second button press. In this example, the display 122 displays the lowercase alphabetic character "a" when the user presses the numeric key 2 a single time. The display 122 will initially show the lowercase alphabetic character "b" when the user presses the numeric key 2 the second time even though the user holds the numeric key 2 in the depressed position. When the numeric key 2 has been held in the depressed position for the character case threshold time period, the display 122 will now display the uppercase alphabetic character "B."

Alternatively, the user may press and hold the numeric key 2 for the character case threshold time period the first time the numeric key 2 is activated to change the character case for the current character. For example, when the user presses and holds the numeric key 2 the first time, the display 122 will initially display the lowercase alphabetic character "a." If the user continues to hold the numeric key 2 in the depressed position for the character case threshold time period, the display 100 will now display the uppercase alphabetic character "A." The user may then release the numeric key 2 and press the numeric key 2 a second time in quick succession (i.e., within a period of time less than the inter-character interval), which causes the display 122 to display the upper case alphabetic character "B." Thus, the system 100 will recognize the change in case for alphabetic characters any time the numeric key is pressed and held for a period of time greater than the character case threshold time period. It should be noted that numeric characters may be entered by pressing the desired numeric key until the display 122 shows the desired numeric character. For example, the numeric character "2" may be entered by pressing the numeric key 2 four times in quick succession.

If the user continues to activate a numeric key (e.g., the numeric key 2) in quick succession, the display 122 will rotate through the alphanumeric characters associated with the numeric key. For example, if the user continuously activates the numeric key 2 in quick succession, the display 122 will display the characters "abc2abc2abc2 . . . " thus allowing the user to correct an erroneous entry. Similarly, the system 100 permits the user to change the character case by holding the numeric key in the depressed position. For example, the user can change from the default case (e.g., lowercase) by pressing and holding the numeric key in the depressed position for more than the character case time period, but may change back to the default case by pressing and holding the numeric key a second time.

The system 100 will enter the current character (e.g., the uppercase alphabetic character "B") into the data storage area 126 when the user activates a different numeric key (e.g., the numeric key 4 to enter the lowercase alphabetic character "i") or if the user does not press any numeric key for the period of time equal to or exceeding the inter-character interval.

The remaining alphabetic characters are entered into the data storage area 126 in the manner described above. That is, the lowercase alphabetic character "i" is entered by pressing the numeric key 4 three times in quick succession where each press of the numeric key 4 is for a period of time less than the character case threshold time period. The first lowercase alphabetic character "l" is entered into the data storage area 126 by pressing the numeric key 5 three times in quick succession where each press of the numeric key 5 is for a period of time less than the character case threshold time period. The second lowercase character "l" cannot be entered until the inter-character interval has expired without any of the numeric keys being pressed. After the expiration of the inter-character interval, the second lowercase character "l" may be entered by pressing the numeric key 5 three times in quick succession where each press of the numeric key 5 is for a period of time less than the character case threshold time period. Punctuation characters may also be entered into the data storage area 126 in a conventional manner. The use of punctuation characters is well known in the art and will not be described herein.

The uppercase alphabetic character "S" may be entered into the data storage area 126 by pressing the numeric key 7 four times in quick succession (i.e., wherein the period of time between presses of the numeric key are each less than the inter-character interval) with one of the four presses being held for a period of time greater than the character case threshold time period. Holding the numeric key 7 in the depressed position for a period of time greater than the character case threshold time period indicates to the system 100 that the current character should be an uppercase alphabetic character. The user enters the remaining alphanumeric characters in the manner described above. Thus, the system 100 offers a simple technique by which the case of the alphabetic text may be easily changed.

Figure 3A:
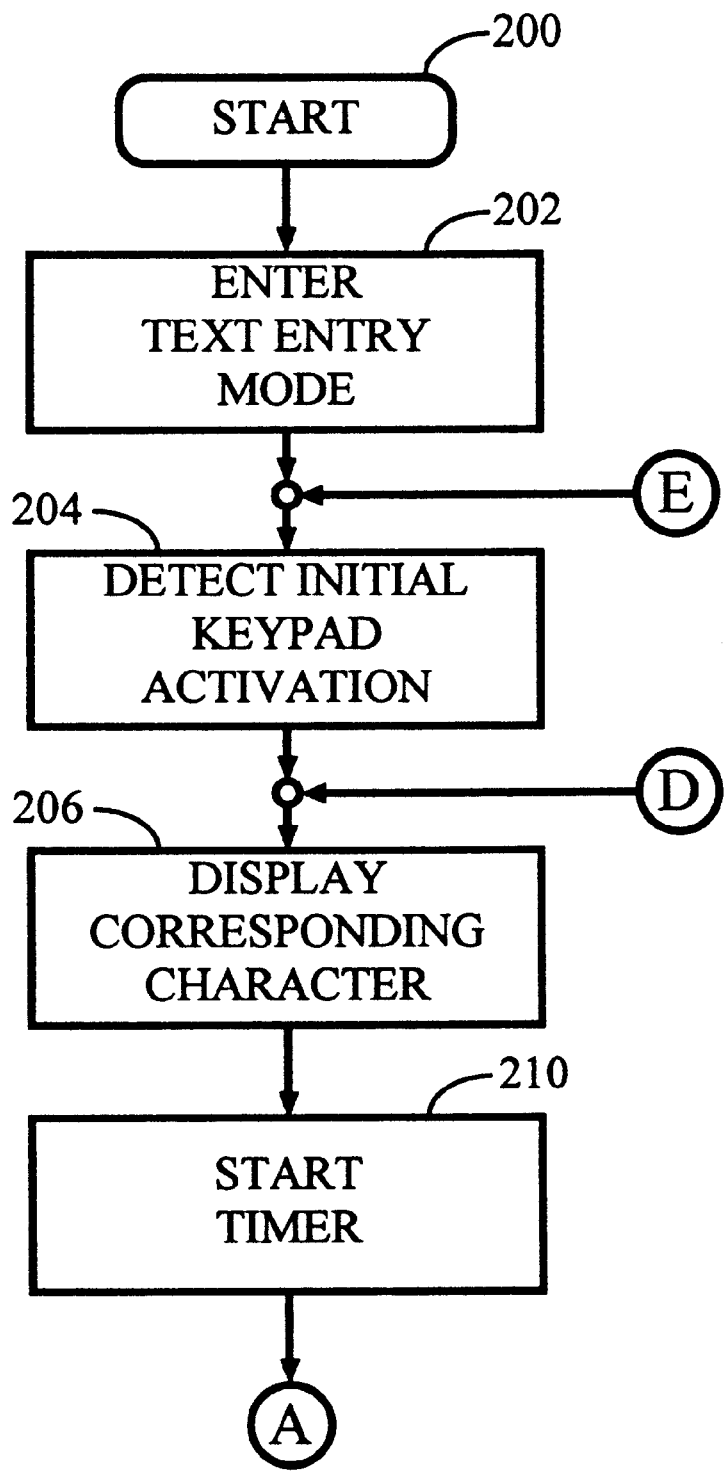
FIGS. 3A to 3C together are a flowchart illustrating the operation of the wireless communication device of FIG. 1A to control the case of text characters.
Figure 3B:
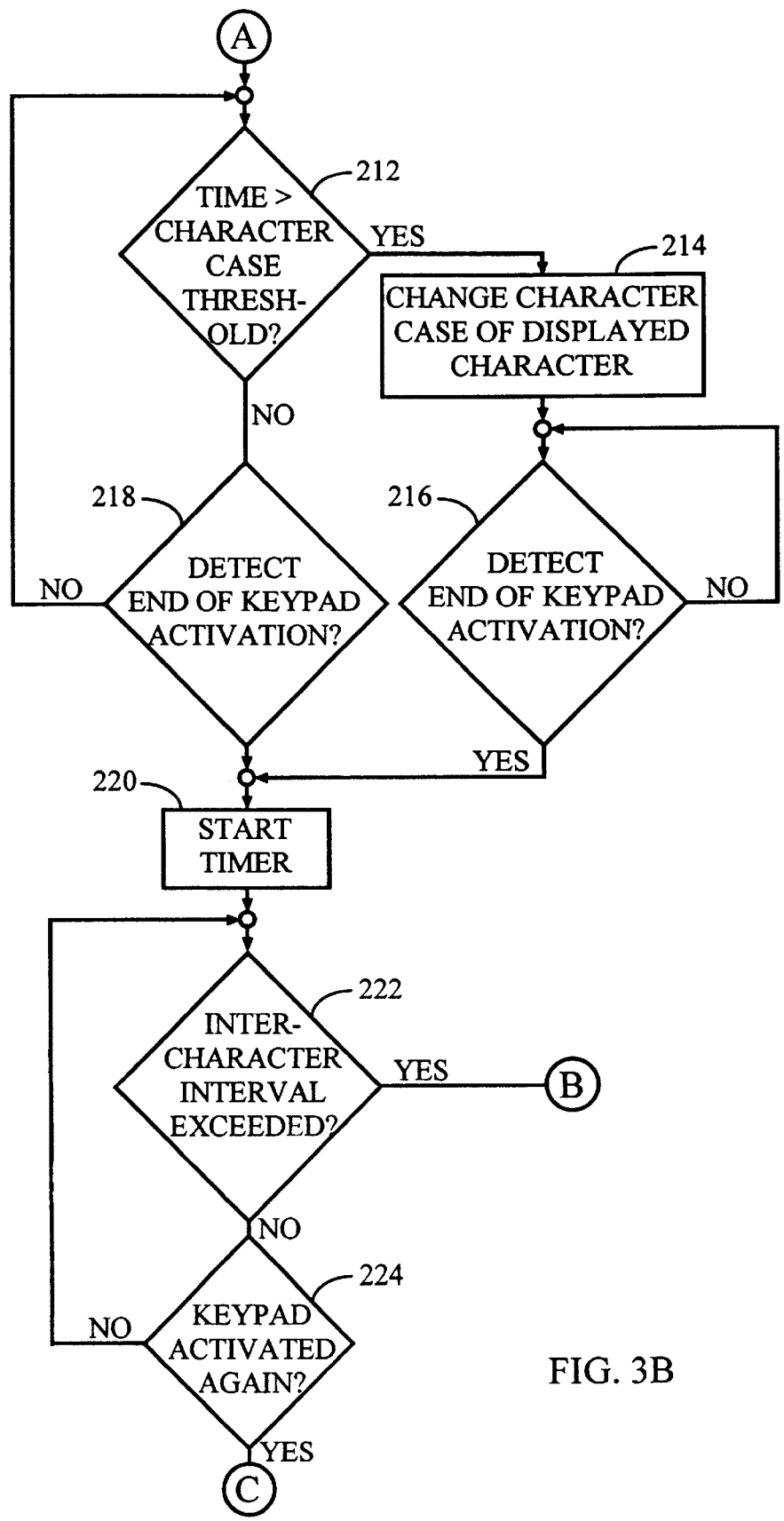
Figure 3C:
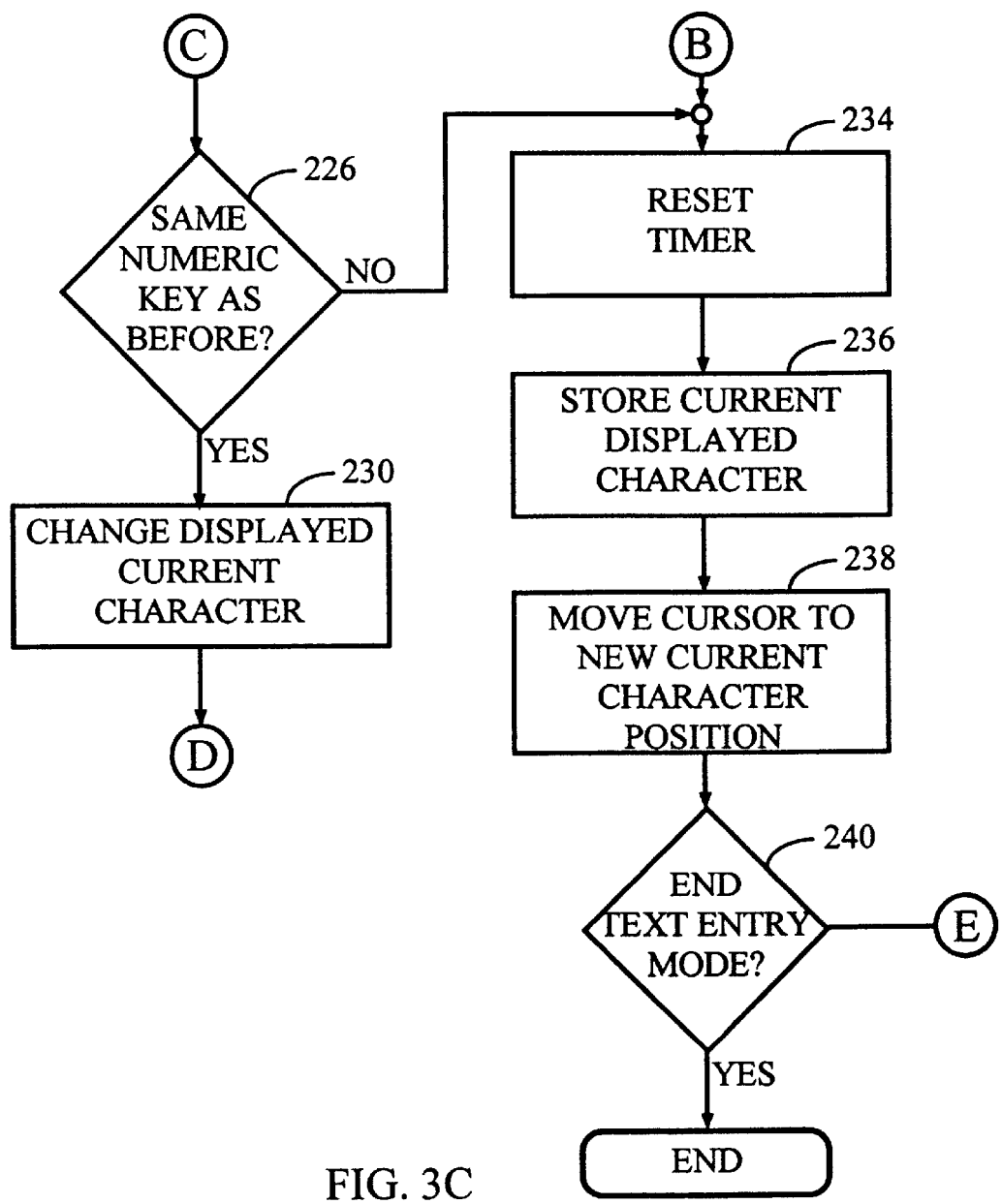

The operation of the system 100 is illustrated in the flowchart of FIGS. 3A to 3C. At a start 200, shown in FIG. 3A, the system 100 is activated. In step 202, the system 100 enters a text entry mode, such as, by way of example, a phone book data entry mode. As can be appreciated by those skilled in the art, the text entry mode may be an edit mode for existing messages, such as e-mail, or a data entry mode to permit the entry of data into the phone book memory of the wireless communication device or the like. The present invention is limited by the particular application for which alphabetic text is entered into the system 100. In step 204, the system 100 detects the initial activation of the keypad 118 (see FIG. 1). In step 206, the system 100 displays an alphanumeric character corresponding to the keypad on the display 122.

In step 210, the system 100 activates the timer 130 to measure the period of time in which the numeric key is pressed. In decision 212, shown in FIG. 3B, the system 100 determines whether the numeric key has been held in the pressed position for a period of time exceeding the character case threshold time period. If the numeric key has been held in the pressed position for the requisite time period, the result of decision 212 is YES and in step 214, the system 100 changes the character case of the current character shown in the display 122. In decision 216, the system awaits the end of keypad activation.

If the numeric key has not been held in the pressed position for the requisite time, the result of decision 212 is NO. In that event, in decision 218, the system 100 determines whether the keypad 118 has detected the end of the keypad activation (i.e., the user has released the selected numeric key). If the selected numeric key is still in the pressed position, the result of decision 218 is NO. In that event, the system 100 returns to decision 212 to determine whether the character case threshold time period has yet been exceeded. If the end of keypad activation has been detected, the results of decision 218 is YES. Thus, the system 100 will change the character case for the current character only if the numeric key was pressed for the character case threshold period.

Following the detection of the end of the activation of a numeric key in decision 216 or in decision 218, the system 100 moves to step 220 and starts the timer 130 (see FIG. 1A) to measure the inter-character time interval (i.e., the elapsed time since the user last pressed any of the numeric keys on the keypad 118). The system 100 moves to decision 222 to determine whether the inter-character interval has been exceeded. If the inter-character interval has not been exceeded, the result of decision 222 is NO. In that event, in decision 224 the system 100 determines whether the keypad 118 has been activated again. If the keypad 118 has not been activated again, the result of decision 224 is NO and the system 100 returns to decision 222 to continue measurement of the inter-character interval. If the keypad 118 has been activated again, the result of decision 224 is YES. In that event, in decision 226, shown in FIG. 3C, the system 100 determines whether the same numeric key has been activated (i.e., the user has pressed the numeric key again in quick succession). If the same numeric key has been activated again, the result of decision 226 is YES. In that event, in step 230, the system 100 changes the current character shown on the display 122 to correspond to the number of times the numeric key has been activated in quick succession and returns to step 206 in FIG. 3A.

If the user has pressed a different numeric key on the keypad 118, the result of decision 226 is NO. The activation of a different numeric key indicates that the current character is accepted by the user. Alternatively, the user can indicate acceptance of the current character by not activating the numeric keys for the inter-character interval. If the inter-character interval has been exceeded, the result of decision 222 is YES. When the user has accepted the current character by pressing a different numeric key (i.e., the result of decision 226 is NO) or by allowing the inter-character interval to be exceeded (i.e., the result of decision 222 is YES), in step 234, shown in FIG. 3C, the system 100 resets the timer 130 and stores the currently displayed character in the data storage area 126 in step 236. In step 238, the system 100 moves a display cursor to a new current character position on the display 122.

In decision 240, the system 100 determines whether the user has activated a button on the keypad 118 to end the text entry mode. If the user has ended the text entry mode, the result of decision 240 is YES and the process ends at 236. If the user has not activated the button on the keypad 118 to terminate the text entry mode, the result of decision 240 is NO and the system 100 returns to step 204, shown in FIG. 3A, to await the entry of a new alphanumeric character.

A simple technique of changing the character case on a character by character basis by holding the numeric key in the depressed position combined with convenient visual feedback from the display 122 provides a simple technique by which a user can quickly enter alphanumeric text into the data storage area 126. Such a data entry technique eliminates the use of a special key to change the character case, reduces the number of key strokes required to enter data by eliminating the need to activate a special key to change back and forth between the upper and lowercase characters and simplifies the data entry process.

It is to be understood that, even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the control of case for alphabetic data storage in a wireless communication device, the system comprising:

a) a housing;
   b) a transceiver within the housing to communicate with a communication device remote from the system;
   c) an antenna affixed to the housing and electrically coupled to the transceiver;
   d) a battery to provide electrical power to the system;
   e) a keypad supported by the housing and comprising a plurality of keys selectively activated by a user, the keypad sensing user operation of selected ones of the keys to enter the alphabetic data wherein a current alphabetic character is entered by selectively activating a target key at least one time to select an alphabetic character based on a number of times that the target key is activated;
   f) a storage area to store user-entered alphabetic data;
   g) a display supported by the housing to display user-entered alphabetic data;
   h) a timer to measure a period of activation of the target key; and
   i) a processor coupled to the keypad and the timer to store user-entered alphabetic data in the storage area, the processor storing the current alphabetic data with a first character case if the period of activation of the target key is less than a predetermined period of time and storing the current alphabetic data with a second character case different from the first character case if the period of activation of the target key is greater than the predetermined period of time:

wherein the user enters alphabetic data for a plurality of alphabetic characters by selectively activating the user input device at least one time for each of the plurality of alphabetic characters, the processor storing data for a current one of the plurality of alphabetic characters with the first case if the period of activation measured by the timer for each of the selectively activated keys corresponding to the current alphabetic character is less than the predetermined period of time and storing data for the current alphabetic character and for all subsequently entered characters following the current alphabetic character with the second case if the period of activation measured by the timer for any of the selected keys corresponding to the current alphabetic character is greater than the predetermined period of time until the period of activation measured by the timer for any of the selected keys corresponding to one of the subsequently entered alphabetic character is greater than the predetermined period of time.

* * * * *